United States Patent [19]

Estavoyer

[11] 4,308,929
[45] Jan. 5, 1982

[54] INTEGRAL PARALLELOGRAM CHARGE RECEIVER AND CAPACITIVE TRANSDUCER

[75] Inventor: Bernard J. Estavoyer, Gif S. Yvette, France

[73] Assignee: Testut-Aequitas, Paris, France

[21] Appl. No.: 135,320

[22] Filed: Mar. 31, 1980

[30] Foreign Application Priority Data

Apr. 2, 1979 [FR] France .................. 79 08218

[51] Int. Cl.³ .................. G01G 3/14; G01G 3/08; G01L 5/00
[52] U.S. Cl. .................. 177/210 C; 177/229; 73/862.68
[58] Field of Search .................. 177/210 C, 229; 73/862.68

[56] References Cited

U.S. PATENT DOCUMENTS 3,986,571 10/1976 Strobel et al. .............. 177/210 C X
4,043,415 8/1977 Luchinger .................. 177/229 X

FOREIGN PATENT DOCUMENTS 2023843 1/1980 United Kingdom ............ 177/210 C

Primary Examiner—George H. Miller, Jr.
Attorney, Agent, or Firm—Dressler, Goldsmith, Shore, Sutker & Milnamow, Ltd.

[57] ABSTRACT

The invention relates to a load receiver for weighing purposes, of the type comprising a stationary upright integral with a frame, a loaded upright integral with a load-carrying plate, and two arms 21 and 22 hinged onto these uprights in order to form therewith a deformable parallelogram. The two uprights and the two arms form an integral unit, the joints being defined by constrictions of the constituent mounting. A capacitor load transducer is formed by a first electrode mounted integrally with the stationary upright and by a second electrode mounted on the parallelogram elsewhere than on the stationary upright. The load receiver is of use notably for commercial balances.

8 Claims, 7 Drawing Figures

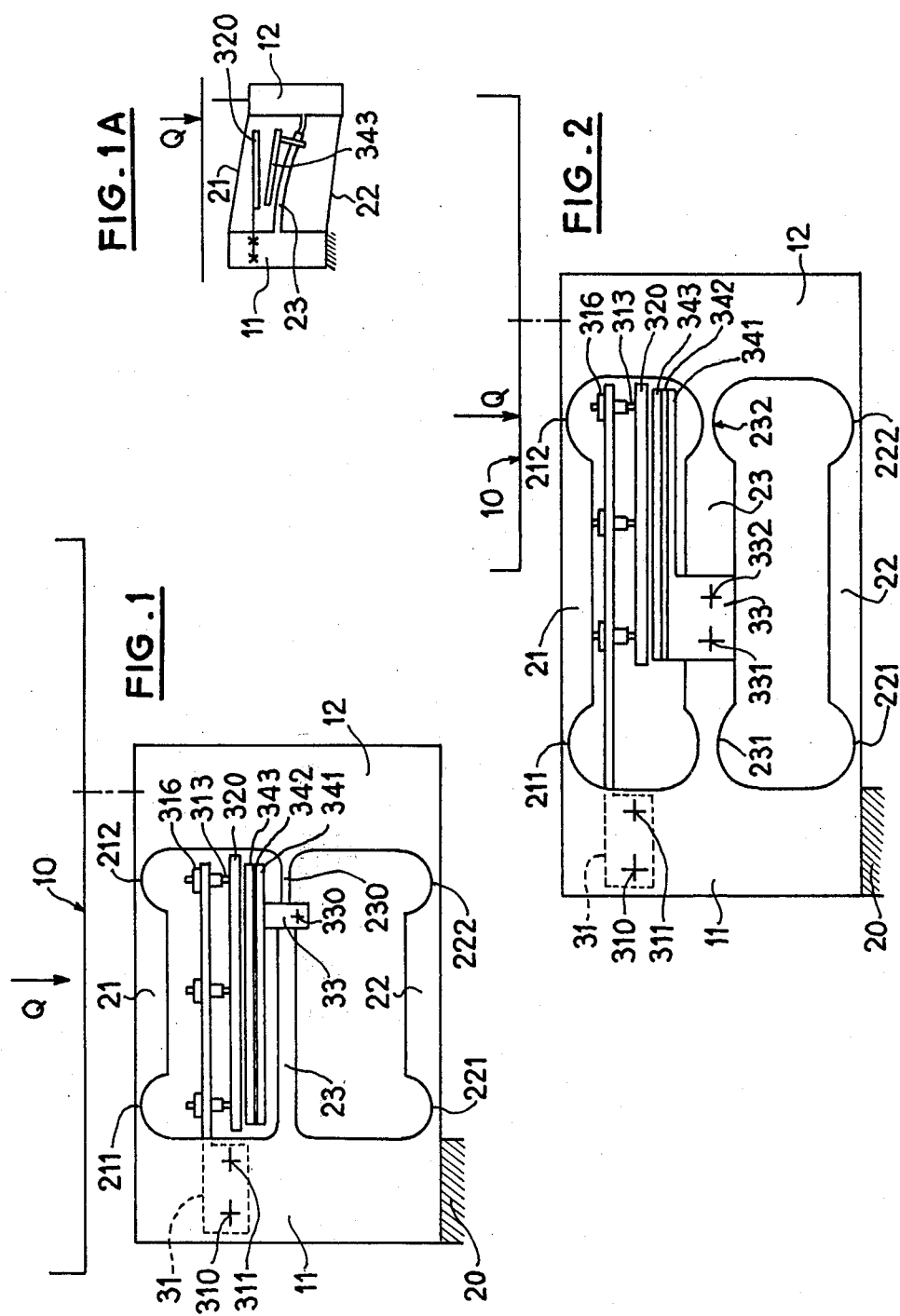

INTEGRAL PARALLELOGRAM CHARGE RECEIVER AND CAPACITIVE TRANSDUCER

This invention relates to a charge or load receiver which can be used notably in balances for commercial use.

Load receivers are already known which comprise a stationary or fixed upright, integral with a frame, a loaded upright integral with a load-carrying plate, and two arms hinged on these uprights to form therewith a deformable parallelogram. The simplest example of a structure of this type is the Roberval balance and its more recent derivatives. Although still used fairly frequently, these earlier load receivers which are of a purely mechanical design are unsuitable for present trends which require balances with electronic measuring means and a luminous numerical display.

We have sought in particular to provide a load receiver which may be associated directly with a capacitive transducer for an electronic display, which is very compact, which is practically insensitive to the variation of position of the load on the receiving plate, and finally which allows a highly reproducible response curve to be obtained, whatever the ambient conditions, notably concerning the temperature.

The load receiver of the invention is of the type mentioned above comprising a stationary upright integral with a frame, a loaded upright integral with a load-carrying plate, and two arms hinged on these uprights to form therewith a deformable parallelogram.

In the invention, the two uprights and the two arms together form an integral unit, the joints being defined by constrictions of the constituent material, like an elastic hinge, and a capacitor load transducer is formed by a first electrode mounted integrally with the stationary upright and by a second electrode mounted on a part of the parallelogram which is mobile under the effect of the load.

According to a secondary characteristic of the invention, the load receiver comprises a third arm, the ends of which are part of the stationary upright and the loaded upright, such that this third arm supplies the essential element of the elastic return imprinted in the loaded upright as a function of its load; in turn, the second electrode is mounted integrally with this third arm. The third arm is mounted advantageously in an intermediate position between the first and the second arms which partly define the deformable parallelogram.

In a first particular embodiment, the ends of the third arm are respectively fitted into the stationary upright and the loaded upright; the second electrode is mounted integrally with the third arm in a position near the loaded upright; finally, the third arm has a reduced cross-section between this position and the loaded upright, with the result that the second electrode is only slightly sensitive to lateral torques exerted on the loaded upright by an eccentric position of the load. As the second electrode may be mounted very close to the loaded upright, this embodiment produces a fairly considerable sensitivity with regard to the output signal as a function of the load.

In a second embodiment, the end of the third arm adjacent the loaded upright has a narrow constriction, while its end adjacent the stationary upright has a less pronounced constriction, supplying the essential element of the elastic return for the loaded upright; the second electrode is mounted integrally with the third arm between its two constrictions, with the result that this second electrode is only sensitive to a very slight extent to lateral torques exerted on the loaded upright when the load is positioned eccentrically. In this arrangement, the insensitivity to the lateral torsional stresses is even smaller than in the first embodiment. On the other hand, as the attachment point of the second electrode is located in the central portion of the third arm, which is more rigid than its ends, the sensitivity is a priori slightly less.

In the two first embodiments which are to be defined, the first and second electrodes may extend laterally and may advantageously have a circular shape; moreover, in order to avoid any error resulting from the electrodes being displaced laterally relative to each other, as a function of the load, it is advantageous for the surface of one of the electrodes to be slightly larger than that of the other electrode so that the capacitive value remains inversely proportional to the spacing of the two electrodes which is itself proportional to the load.

In a third embodiment, the second electrode is mounted integrally with the loaded upright, and the two electrodes thus have elongated surfaces according to the general direction of the arms. The surface, of one of the electrodes as will be indicated, is advantageously slightly greater than that of the other. In this embodiment, the insensitivity to the lateral torsional stresses is less pronounced, while on the contrary, the sensitivity to the load is even better and the capacitive value is a simple function of the displacement through translation of the electrodes.

The third embodiment may be produced economically without the third arm parallel to the two first arms, which is located between the stationary upright and the loaded upright. However, such a third arm allows the function of "definition of the parallelogram" to be separated from the function of elastic return.

The load is measured very advantageously and effectively by electronic circuits in which the ratio is evaluated of the capacity of the capacitive load transducer, defined by the first and second electrodes, to the capacity of a reference capacitor. According to another characteristic of the invention, the supports of the capacitive load transducer and also of the reference capacitor are arranged so that the relative variation of the at-rest spacing of their respective electrodes as a function of the temperature is equal to the relative variation as a function of the temperature of the modulus of elasticity of the material supplying the elastic restoring force opposed to the load. When there is a third arm, the essential element of the elastic return is supplied by this arm, and the modulus of elasticity is thus taken on the material of this third arm. In the variation of the third embodiment in which a third arm is omitted, the elastic return is thus supplied by the different elastic hinges which are located between the two arms originally mentioned and the stationary and loaded uprights, and the modulus of elasticity is thus taken on this same material. It will be noted that, insofar as the stationary and loaded uprights and the two or three arms are produced from the same material, the modulus of elasticity is in principle always the same.

Other characteristics and advantages of the invention will become evident when reading the detailed description which follows, with reference to the accompanying drawings which illustrate different embodiments of the present invention in a non-limiting manner.

FIG. 1 is a schematic lateral view of the first particular embodiment of the present invention;

FIG. 1A is a simplified view corresponding to FIG. 1 and illustrating the deformation of the device of FIG. 1 when loaded;

FIG. 2 is a schematic lateral view of a second embodiment of the invention;

Figure 3A:
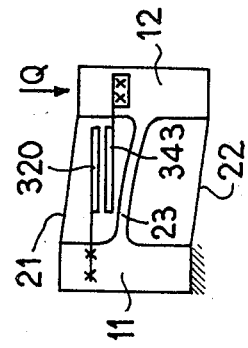
FIG. 3A is a simplified view corresponding to FIG. 3 and illustrating the deformation when loaded of the third embodiment of the invention.
Figure 3:
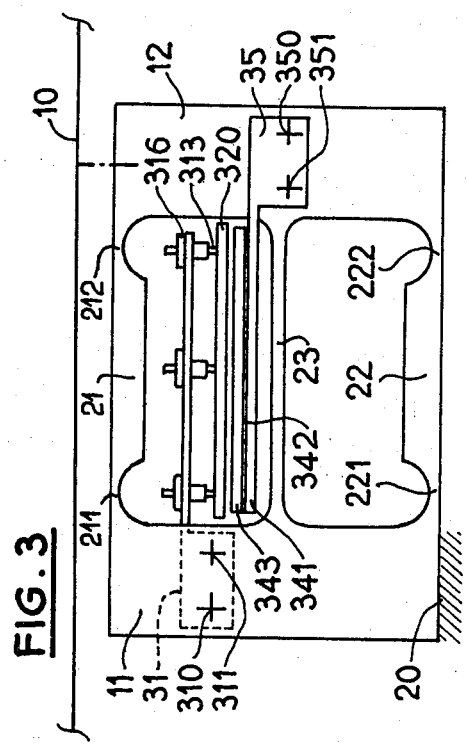
FIG. 3 is a schematic lateral view of a third embodiment of the invention.

In all of the FIGS. 1 to 3, the reference number 10 designates a load-carrying plate which is adapted to support at any point a load designated by the letter Q. A fixed, or stationary upright 11 is mounted on a frame shown schematically by 20, while a loaded upright 12 is integral with the load-carrying plate 10. Two arms 21 and 22 are located between the fixed upright 11 and the loaded upright 12. The arm 21 is connected to the fixed upright 11 by an elastic hinge 211 produced by a constriction of the constituent material, while another hinge 212, produced by another constriction, connects the same arm 21 to the loaded upright 12. In an analogous manner, the arm 22 is connected to the fixed upright 11 by a constriction 221 and is connected to the loaded upright 12 by a constriction 222. Thus, the construction is integral and constitutes a deformable parallelogram.

FIGS. 1 to 3 also have the fact in common that a fixed electrode support 31 is attached at 310 and 311 onto the fixed upright 11. This support 31 sustains a stationary electrode 320 by means of one or more intermediate members such as steatite bushings as at 316 and electrode attachments rods as at 313.

FIGS. 1 to 3 also have the fact in common that the parallelogram is completed by a third arm designated by reference number 23 and mounted between the fixed upright and the mobile upright 12 in an intermediate position between the arms 21 and 22. Thus, the structure and function of the third arm differ according to the different Figures; it is also observed, moreover, that under certain conditions, the third arm may be omitted in the embodiment of FIG. 3.

In FIG. 1, the arm 23 forms a restrained beam having a substantially constant cross-section in respect of the stationary fixed 11. Towards one end of this restrained beam of constant cross-section, there is a mobile electrode support 33, attached onto the arm 23 at 330. On the other side, either immediately after the support 33, or after certain portion of the arm which retains the cross-section shown at 23, the arm 23 continues integrally with a part 230, the cross section of which is smaller that that of the portion connected to the fixed upright 11. This section 230 is inserted in the mobile upright 12 also in the manner of a restrained beam.

The support 33, surmounted by an electrode attachment member 341, supports an insulating base-plate 342, for example made of bakelite, of the electrode itself 343.

When examining this first embodiment, it appears that the arms 21 and 22 of the parallelogram ensure the displacement of the loaded upright 12, but do not participate a great deal in balancing the load, which is principally effected by the arm 23. On the other hand, the unit of the two arms 21 and 22, owing to its parallelogram construction, has a very considerable rigidity to the lateral torsion because the load is positioned eccentrically on the plate 10.

The arm 23 in turn balances the load by the elastic return which it allows because it fits into the fixed upright as well as into the mobile upright. As a result of its reduced cross-section, the mobile end 230 embedded by the loaded upright 12 remains noticeably horizontal and generally parallel to the end embedded in the fixed upright 11, as indicated by FIG. 1A. Also, the reduced cross-section utilised in the portion 230 decreases the transmission of the lateral torque on the normal portion 23 of the arm which may result from the fact that the load is positioned eccentrically on the plate 10.

As a result, there is a decoupling in torsion between the loaded upright 12 and the arm 23 and particularly between the electrode holder 33. By thus attaching the mobile electrode 343 onto this support 33, the load applied on the plate 10 is transformed into a translation-rotation which is proportional. The nearer the attachment point 330 is brought to the loaded upright 12, the closer to the horizontal is the tangent to the arm 23, at this point. As a result of this fate, the longitudinal inclination of the loaded mobile electrode 343 is slight and its movement in respect of the stationary electrode 320 thus approximates a pure rotation which is very easy to translate into a linearisable measure without any problems using electronic circuits. At this stage, it should be recalled that the lateral parasitic inclination of the mobile electrode 343 under the effect of an eccentric lateral load is made very small as a result of the particular structure of the bar 23 and its portion 230.

FIG. 2 shows a second embodiment of the invention which differs slightly from the first embodiment.

The differences consist substantially in the particular structure of the intermediate arm 23 which is connected here at one end to the loaded upright 12 by a narrow constriction 232, and at the other end to the fixed upright 11 by a less pronounced constriction 231. As the constriction 231 has a much larger cross-section, it supplies the essential element of the elastic return applied to the arm 23 and by means of the arm to the loaded upright 12.

By thus using two different attenuations at the ends of the intermediate arm 23, a greater torsional decoupling is achieved between the loaded upright 12 and the bar 23, owing to the fact that the load is positioned eccentrically. Thus, the result of this structure is that the mobile electrode is attached at 331 and 332 by its support 33 at a greater distance than, in FIG. 1 from the loaded upright 12, with a resulting sensitivity which is slightly less effective. From the mobile electrode holder 33, the mobile electrode 343 is supported in the same manner described in connection with FIG. 1.

It will also be noted that in this second embodiment, as a result of the attachment of the arm 23 to the fixed and loaded uprights by means of the two constrictions, this arm is subjected to a translation-rotation movement which is purer than in the first embodiment, and hence there is an even greater linearity of the signals obtained at the level of the capacitive transducer produced by the first and second electrodes.

FIG. 3 shows the third particular embodiment of the present invention. It differs from the previous embodiments in that the support 35 of the mobile electrode is attached in this case onto the loaded upright 12 at two points designated by reference numbers 350 and 351. Moreover, as before, the support has a steel base comprising the portions 35 and 341, an insulating base-plate 342 made of bakelite and the mobile electrode itself 343.

In this third embodiment, when the mobile electrode is displaced it remains normally strictly parallel to the stationary electrode. The movement between the two electrodes is thus a pure translation, and hence an even simpler linearisation of the measuring signal obtained on the capacitive transducer can be achieved. However, this is only valid if the load is centred perfectly on the load-carrying plate 10. If this is not so, a disturbing torque arises which is exerted on the loaded upright 12, which tends to be transformed into a rotation of the mobile electrode 343 about a horizontal axis located in the plane of FIG. 3. In order to restrict the harmful effects of such a torsion, it is advantageous to design the shape of the electrodes accordingly, by giving them an elongated shape in the sense of the horizontal direction of FIG. 3 and a small width in the other direction, i.e. in a plane perpendicular to FIG. 3. If the working electrode surface is defined in the manner stated above, the electrode which is used according to FIG. 3 is thus longer in the sense of the direction of the arms 23 and smaller in the direction perpendicular to the plane of the Figure, unlike FIGS. 1 and 2, where the electrode was noticeably isometric, as indicated previously.

Figure 5:
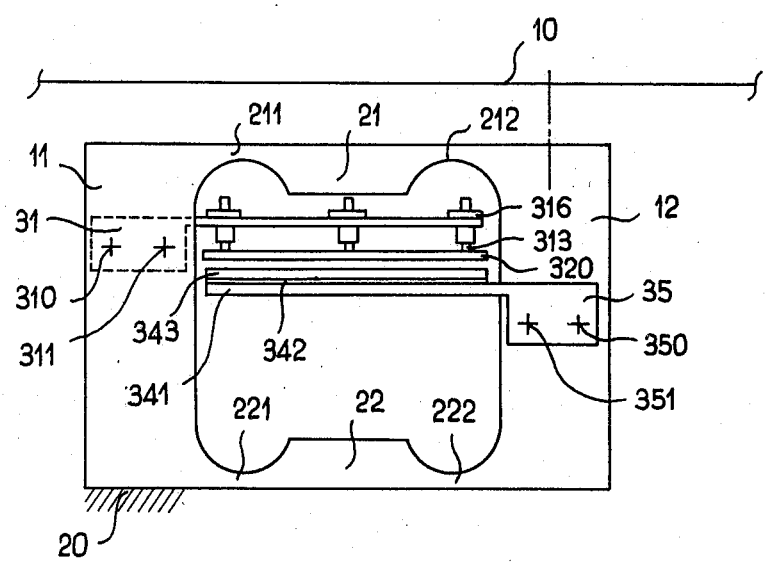
FIG. 5 is a schematic lateral view of a variation of the third embodiment without a third arm.

In the embodiment of FIG. 3, it is advantageous, as in the previous embodiments, to use an intermediate arm 23 which interconnects the fixed upright 11 and the loaded upright 12 in the manner of a restrained beam. The intermediate arm in this case has a constant cross section and thus supplies the essential element of the elastic return applied to the loaded upright 12. However, a very simple variation consists in not using an arm of this type, but making the constrictions 211, 212, 221 and 222 slightly wider so that they themselves effect the elastic return (FIG. 5).

In the embodiment shown in FIG. 3, a loaded deformation is achieved which is illustrated schematically in FIG. 3A and it can be seen that the stationary electrode and the mobile electrode generally remain parallel to each other.

In the different embodiments above, a capacity is finally acquired between the two electrodes 320 and 343, which has a certain at-rest value in the absence of a load, and which has a value in the presence of a load dependant upon the value of the load itself. Although it is possible to envisage different ways of measuring the value of this capacity in order to achieve the load, it is preferred to use the means described in French Patent Application No. 77 28758 filed on Sept. 23, 1977 in our name. Similarly, the load is measured by evaluating the ratio of the capacity defined by the capacitive load transducer (electrodes 320 and 343) to the capacity of a reference capacitor.

Our experiments have shown that the measurments thus effected depend on the temperature for two reasons: firstly, the modulus of elasticity or Young's modulus of the material supplying the elastic return varies as a function of the temperature, and secondly, the dimensions of the different elements of the load receiver, and notably of the supports of the electrodes and also the surface of the electrodes, themselves vary as a function of the temperature.

We have observed that it is possible to compensate the effects of temperature variations satisfactorily by proceeding in the following manner. The reference capacitor is such that its supports are arranged so that the relative variation of the spacing of the electrodes, as a function of the temperature, is equal to the relative variation of the modulus of elasticity of the material which supplies the elastic restoring force.

The supports of the measuring capacitor are arranged in an indentical manner so that the relative variation of the spacing of the electrodes without a load, or under a constant tare load, is equal to the relative variation of the modulus of elasticity as a function of the temperature. If the reference capacitor and the capacitive transducer comprise electrodes having the same configuration, the same dimensions and the same no-load spacing, the compensation is thus quasi rigorous.

Figure 4:
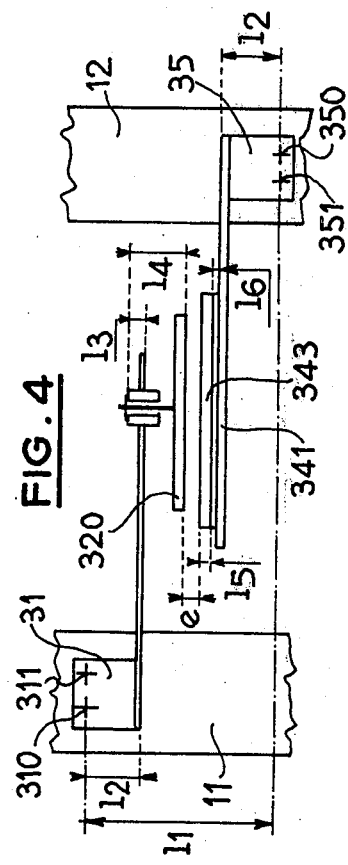
FIG. 4 is a very simplified view illustrating how a temperature compensation may be effected on the electrodes of the capacitive transducer or of the reference capacitor used in one of the devices of the present invention.

The above obviously applies to the different embodiments of the invention. FIG. 4 shows how it may be applied to the embodiment of FIG. 3.

The different elements constituting the electrodes and their support are distinguished by their temperature-expandable length (FIG. 4) and their coefficient of expansion as a function of the material of which they are made.

$l_2$ represents the length of the electrode supports constructed in a material of coefficient $a_2$. The distance between the centres of the attachment points on the uprights is $l_1$, the metal support having a coefficient $a_1$. The electrodes in a material of coefficient $a_4$ have lengths $l_4$ and $l_5$.

The insulating portions have lengths $l_3$ of coefficient $a_3$ for the higher electrode and $l_6$, $a_6$ for the lower electrode.

The spacing value between the active surfaces of the electrodes is labelled e; the variation of the modulus of elasticity to be compensated is indicated by $\Delta E$.

The condition to be met in order that the temperature compensation of the variation of the modulus of elasticity is realised is written thus:

$$l_1 \cdot a_1 - 2l_2 \cdot a_2 + l_3 \cdot a_3 - (l_4 + l_5) \cdot a_4 - l_6 \cdot a_6 = e \cdot \Delta E$$

The value e is given as a function of the value of the capacity which has been selected for the electrodes at a reference temperature which may be the ambient temperature, the lengths of the insulated electrodes being selected in any particular construction, so that the values $e_3$, $e_4$, $l_5$ and $l_6$ are thus known.

The compensation equation mentioned above allows the value $l_2$ to be achieved, and then to deduct the value $l_1$ as a function of the coefficients of expansion of the selected materials.

The argument developed for the measuring capacitor of which one of the electrodes 343 is attached to the mobile upright 12, is perfectly valid for the reference capacitor; the supports of the electrodes of the latter are thus attached to an unloaded support of the same material as that of the load receiver.

What is claimed is:

1. A load receiver comprising a stationary upright secured to a frame; a loaded upright secured to a load-carrying plate; two arms hinged into the uprights in order to form therewith a deformable parallelogram, the improvement wherein said two uprights and said two arms form an integral unit, the hinged joints being defined by constrictions of the constituent material of said integral unit, said integral unit having a portion thereof opposing an elastic response to the weight of a load placed on said load-carrying plate; a first electrode is secured with the stationary upright; and a second electrode is secured with a portion of said integral unit which is mobile under the effect of the load, said first and second electrodes defining a capacitive load transducer having a capacitive value related to the value of the load applied to said load carrying plate.

2. A load receiver according to claim 1, in which the load is measured by evaluating the ratio of the capacity of the capacitive load transducer to that of a reference capacitor, the supports of the capacitive load transducer and of the reference capacitor being arranged so that the relative variation of the at-rest spacing of their electrodes as a function of temperature is equal to the relative variation as a function of temperature of the modulus of elasticity of the material supplying the elastic restoring force opposed to the load.

3. A load receiver according to claim 1, wherein said integral unit comprises a third arm, the end of which are respectively integral with the stationary upright and the loaded upright, said third arm supplying the essential element of the elastic return, imprinted at the loaded upright as a function of its load, the second electrode being secured to this third arm.

4. A load receiver according to claim 3, wherein the ends of the third arm are respectively cantilevered into the stationary upright and the loaded upright, the second electrode is secured to the third arm at a point close to the loaded upright, and the third arm has a reduced cross-section between this point and the loaded upright, whereby the second electrode is slightly sensitive to lateral torques exerted on the loaded upright due to the load being positioned eccentrically.

5. A load receiver according to claim 3, wherein the end of the third arm adjacent the loaded upright has a narrow constriction while its end adjacent the stationary upright has a less pronounced constriction, supplying the essential portion of the elastic return for the loaded upright, and the second electrode is mounted integrally with the third arm between its two constrictions, whereby this second electrode is sensitive to a very slight extent to lateral torques exerted on the loaded upright due to the load being positioned eccentrically.

6. A load receiver according to claim 4 or 5, wherein the first and second electrodes have substantially isometric surfaces, the surface being slightly larger for one of the electrodes than for the other.

7. A load receiver according to claim 1 or 3, wherein the second electrode secured to the loaded upright and the two electrodes have elongated surfaces according to the general direction of the arms, the surface being slightly larger for one of the electrodes than for the other.

8. A load receiver according to claim 7 when dependent on claim 3, wherein the cross-section of the third arm is substantially constant.

* * * * *